US011108050B2

(12) United States Patent
Kim et al.

(10) Patent No.: US 11,108,050 B2
(45) Date of Patent: Aug. 31, 2021

(54) CONDUCTIVE MATERIAL DISPERSED LIQUID AND SECONDARY BATTERY MANUFACTURED USING THE SAME

(71) Applicant: LG Chem, Ltd., Seoul (KR)

(72) Inventors: Ye Lin Kim, Daejeon (KR); Ki Yeon Jo, Daejeon (KR); Jung Keun Yoo, Daejeon (KR); Je Young Kim, Daejeon (KR); Sang Hoon Choy, Daejeon (KR); Jong Heon Seol, Daejeon (KR)

(73) Assignee: LG Chem, Ltd.

( * ) Notice: Subject to any disclaimer, the term of this patent is extended or adjusted under 35 U.S.C. 154(b) by 28 days.

(21) Appl. No.: 15/759,677

(22) PCT Filed: Mar. 24, 2017

(86) PCT No.: PCT/KR2017/003222
§ 371 (c)(1),
(2) Date: Mar. 13, 2018

(87) PCT Pub. No.: WO2017/164703
PCT Pub. Date: Sep. 28, 2017

(65) Prior Publication Data
US 2019/0044150 A1 Feb. 7, 2019

(30) Foreign Application Priority Data

Mar. 24, 2016 (KR) .................. 10-2016-0035560
Mar. 24, 2017 (KR) .................. 10-2017-0037748

(51) Int. Cl.
| | | |
|---|---|---|
| *H01M 4/62* | (2006.01) | |
| *H01M 10/05* | (2010.01) | |
| *H01M 4/13* | (2010.01) | |
| *C01B 32/174* | (2017.01) | |
| *H01B 1/24* | (2006.01) | |
| *H01M 4/139* | (2010.01) | |
| *H01M 10/0525* | (2010.01) | |
| *H01M 10/052* | (2010.01) | |
| *H01M 4/02* | (2006.01) | |
| *H01M 4/04* | (2006.01) | |

(52) U.S. Cl.
CPC ........... *H01M 4/625* (2013.01); *C01B 32/174* (2017.08); *H01B 1/24* (2013.01); *H01M 4/139* (2013.01); *H01M 4/622* (2013.01); *H01M 10/052* (2013.01); *H01M 10/0525* (2013.01); *H01M 4/0404* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2012/0028117 A1 | 2/2012 | Plee et al. | |
| 2013/0139711 A1* | 6/2013 | Clarke | B41F 15/44 101/123 |
| 2013/0337326 A1 | 12/2013 | Mun et al. | |
| 2014/0205932 A1 | 7/2014 | Hori et al. | |
| 2014/0353556 A1 | 12/2014 | Shigeta et al. | |
| 2015/0273441 A1 | 10/2015 | Kim et al. | |
| 2015/0298974 A1 | 10/2015 | Kim et al. | |
| 2015/0364749 A1* | 12/2015 | Kim | H01M 4/1391 252/506 |
| 2016/0020466 A1* | 1/2016 | Ulbrich | H01M 4/0404 429/217 |
| 2017/0036914 A1* | 2/2017 | Sohn | C09D 7/65 |
| 2018/0175370 A1 | 6/2018 | Kim et al. | |
| 2018/0198129 A1 | 7/2018 | Kim et al. | |

FOREIGN PATENT DOCUMENTS

| | | | |
|---|---|---|---|
| CN | 107851800 A | 3/2018 | |
| EP | 3301745 * | 4/2018 | ............. H01M 4/62 |
| EP | 3301745 A1 | 4/2018 | |
| EP | 3355393 * | 8/2018 | ............. H01M 4/62 |
| EP | 3355393 A1 | 8/2018 | |
| JP | 2005075661 A | 3/2005 | |
| JP | 2011047081 A | 3/2011 | |
| JP | 5429596 B2 | 2/2014 | |
| JP | 2014049380 A | 3/2014 | |

(Continued)

OTHER PUBLICATIONS

Suda Yoshiyuki, et al., "New Development of Carbon Nanomaterials", Journal of Plasma Fusion Research, Oct. 2012, vol. 88, No. 11, p. 629-638.
Third Party Observation for JP 2018516054 dated Aug. 2, 2019.
Extended European Search Report including Written Opinion for PCT/KR2017/003222 dated Dec. 21, 2018.
Search report from International Application No. PCT/KR2017/003222, dated Jun. 30, 2017.
Search Report from Chinese Office Action for Application No. 2017800033149 dated Jul. 2, 2020; 3 pages.

*Primary Examiner* — Jonathan Crepeau
*Assistant Examiner* — Angela J Martin
(74) *Attorney, Agent, or Firm* — Lerner, David, Littenberg, Krumholz & Mentlik, LLP (57) ABSTRACT

The present invention provides a conductive material dispersed liquid including a conductive material which includes bundle-type carbon nanotubes; a dispersant which includes a hydrogenated nitrile-based rubber; and a dispersion medium, where a complex modulus (|G*| @ 1 Hz) is in a range of 20 to 500 Pa when measured by a rheometer at a frequency of 1 Hz, and a secondary battery manufactured using the same. The conductive material dispersed liquid has a controlled complex modulus to exhibit excellent dispersibility and powder resistance characteristics, and as a result, can greatly improve the output characteristics of batteries.

15 Claims, 3 Drawing Sheets

(56) References Cited

FOREIGN PATENT DOCUMENTS

| | | | | |
|---|---|---|---|---|
| JP | 2014203804 A | | 10/2014 | |
| JP | 2015178446 A | | 10/2015 | |
| JP | 2016501813 A | | 1/2016 | |
| JP | 2016502494 A | | 1/2016 | |
| KR | 20090054677 A | | 6/2009 | |
| KR | 20110136867 A | | 12/2011 | |
| KR | 20120071522 A | | 7/2012 | |
| KR | 20130139711 A | | 12/2013 | |
| KR | 20140095999 | * | 8/2014 | .......... H01M 10/052 |
| KR | 201400095999 | * | 8/2014 | .......... H01M 10/052 |
| KR | 20150016852 | * | 2/2015 | ............... B82B 1/00 |
| KR | 20150016852 A | | 2/2015 | |
| KR | 20150067049 A | | 6/2015 | |
| KR | 1020150067049 | * | 6/2015 | .......... H01M 10/052 |
| KR | 20150122653 A | | 11/2015 | |
| KR | 1020150122653 | * | 11/2015 | ............ C01B 31/02 |
| KR | 20150135090 A | | 12/2015 | |
| KR | 1020150135090 | * | 12/2015 | ................ B22F 9/06 |
| WO | 2006082708 A1 | | 8/2006 | |
| WO | 2013031060 A1 | | 3/2013 | |
| WO | 2013080912 A1 | | 6/2013 | |
| WO | 2015020280 A1 | | 2/2015 | |
| WO | 2015093904 A1 | | 6/2015 | |

\* cited by examiner

CONDUCTIVE MATERIAL DISPERSED LIQUID AND SECONDARY BATTERY MANUFACTURED USING THE SAME

CROSS-REFERENCE TO RELATED APPLICATIONS

This application is a national phase entry under 35 U.S.C. § 371 of International Application No PCT/KR2017/003222 filed Mar. 24, 2017, which claims priority to Korean Patent Application No. 10-2016-0035560, filed on Mar. 24, 2016, and Korean Patent Application No. 10-2017-0037748, filed on Mar. 24, 2017, the disclosures of which are incorporated herein by reference.

TECHNICAL FIELD

The present invention relates to a conductive material dispersed liquid which is useful in the production of high output electrodes due to having excellent dispersibility and low powder resistance characteristics, a method of preparing the conductive material dispersed liquid and a secondary battery manufactured using the conductive material dispersed liquid.

BACKGROUND ART

As technological development and demand for mobile devices increase, demand for secondary batteries as energy sources is rapidly increasing. Among these secondary batteries, lithium secondary batteries having a high energy density and voltage, a long cycle life, and a low self-discharge rate are commercially available and widely used. Further, to make an electrode for such a high-capacity lithium secondary battery, research on methods for producing an electrode having a higher energy density per unit volume by improving electrode density has been actively conducted.

Generally, since a high-density electrode is formed by molding electrode active material particles having a size of several m to several tens of m using a high-pressure press, particles are deformed, the space between the particles is reduced, and electrolyte permeability may be lowered.

In order to solve such a problem, a conductive material having excellent electrical conductivity and strength is used in the production of electrodes. When a conductive material is used in the production of electrodes, the conductive material is dispersed among the compressed electrode active material, and thereby fine pores are maintained between the active material particles to facilitate the penetration of the electrolyte, and the resistance in the electrode can be lowered due to excellent conductivity. Among such conductive materials, the use of carbon nanotubes, which are fibrous carbon-based conductive materials, capable of further reducing electrode resistance by forming an electrically conductive path in the electrode has been increasing.

The carbon nanotube, which is a type of fine carbon fiber, is tubular carbon having a diameter of 1 μm or less, and is expected to be applied and practically used in various fields due to high conductivity, tensile strength, and heat resistance attributable to the specific structure thereof. However, despite the availability of such carbon nanotubes, the use of carbon nanotubes is limited due to low solubility and dispersibility thereof. Accordingly, in the preparation of electrodes using carbon nanotubes, carbon nanotubes are linearly dispersed in a dispersion medium, and then a composition for forming an electrode is prepared and used.

However, carbon nanotubes do not stably disperse in the dispersion medium, and an aggregation phenomenon occurs due to the strong van der Waals attraction between the carbon nanotubes.

Various attempts have been made to address these issues. Specifically, a method of dispersing carbon nanotubes in a dispersion medium through mechanical dispersion treatment such as ultrasonic treatment has been proposed. However, in this method, dispersibility is excellent while the ultrasonic wave is irradiated, but the carbon nanotubes start to aggregate when the ultrasonic irradiation is finished, and get aggregated as a concentration of carbon nanotubes increases. Further, a method of dispersing and stabilizing carbon nanotubes using various dispersants has been proposed. However, this method also has a problem in that, when fine carbon nanotubes are dispersed at a high concentration in a dispersion medium, handling becomes difficult due to an increase in viscosity.

Accordingly, there is a need for development of a method capable of improving the dispersibility of carbon nanotubes in an electrode without reducing conductivity, and a method of preparing a carbon nanotube dispersed liquid which is useful in the production of electrodes using the above-described method.

DISCLOSURE

Technical Problem

A first objective of the present invention is to provide a conductive material dispersed liquid which is useful in the production of high output electrodes due to having excellent dispersibility and low powder resistance characteristics, and a method of preparing the conductive material dispersed liquid.

A second objective of the present invention is to provide a composition for forming an electrode of a secondary battery, which includes the conductive material dispersed liquid.

Further, a third objective of the present invention is to provide an electrode for a secondary battery, a lithium secondary battery, a battery module and a battery pack manufactured using the conductive material dispersed liquid.

Technical Solution

In order to achieve the objectives, according to an embodiment of the present invention, there is provided a conductive material dispersed liquid, including: a conductive material including bundle-type carbon nanotubes; a dispersant including a hydrogenated nitrile-based rubber; and a dispersion medium, where a complex modulus (|G*| @1 Hz) is in a range of 20 to 500 Pa when measured by a rheometer at a frequency of 1 Hz.

According to another embodiment of the present invention, there is provided a method of preparing the conductive material dispersed liquid, including mixing a conductive material which includes bundle-type carbon nanotubes, a dispersant and a dispersion medium comprising the hydrogenated nitrile-based rubber, and then milling such that a complex modulus (|G*| @ 1 Hz) is in a range of 20 to 500 Pa when measured by a rheometer at a frequency of 1 Hz.

Further, according to still another embodiment of the present invention, there is provided a composition for forming an electrode of a secondary battery, which includes the conductive material dispersed liquid, an electrode active material and a binder.

According to yet another embodiment of the present invention, there are provided an electrode for a secondary battery and a lithium secondary battery manufactured using the composition for forming an electrode.

Other details of embodiments of the present invention are incorporated in the detailed description of the invention described below.

Advantageous Effects

In a conductive material dispersed liquid according to the present invention, carbon nanotubes having excellent conductivity as a conductive material are optimally dispersed, and thereby powder resistance of a composition for forming an electrode can be reduced to improve output characteristics of an electrode when applied to the production of the electrode. Accordingly, the conductive material dispersed liquid is useful for producing electrodes in batteries requiring high output characteristics such as batteries for automobiles.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure should not be construed as being limited to the drawings.

BEST MODE OF THE INVENTION

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Unless otherwise specified, the term "bundle type" used in the present invention refers to a secondary shape of bundles in which a plurality of carbon nanotube units are arranged such that the axes in the longitudinal direction of the units are arranged in a substantially parallel orientation, or are helically twisted. Further, the term "non-bundle type" or "entangled type" refers to a shape in which a plurality of carbon nanotube units are entangled without a constant shape and not limited to specific orientations such as a shape of bundles or ropes.

Generally, when an electrode for a secondary battery is produced using a conductive material including carbon nanotubes, carbon nanotubes are dispersed in a dispersion medium to prepare a dispersion liquid first, and a composition for forming an electrode and an electrode are prepared using the dispersion liquid in order to improve the dispersibility. Accordingly, it is required to use a conductive material dispersed liquid having viscosity and dispersibility suitable for the composition for forming an electrode to improve characteristics of an electrode and a battery, particularly output characteristics of the battery. To this end, it is necessary to be able to easily evaluate and measure the degree of dispersion of conductive material in the conductive material dispersed liquid.

Conventionally, the degree of dispersion of conductive material in a conductive material dispersed liquid was evaluated by particle size distribution measured by a particle size analyzer (PSA). However, in the case of linear carbon nanotubes such as bundle-type carbon nanotubes, the particle size varies depending on the measurement angle, and thus it is difficult to evaluate dispersibility in a dispersion liquid. Further, when the linear carbon nanotubes are overdispersed, contact resistance increases and output characteristics of a battery may be greatly reduced.

Accordingly, the present invention provides a conductive material dispersed liquid having dispersibility of a conductive material and viscosity characteristics which are advantageous for the formation of high output electrodes due to control of a complex modulus ($|G^*|$ @ 1 Hz) of the conductive material dispersed liquid, when electrodes are produced using a conductive material including bundle-type carbon nanotubes.

That is, the conductive material dispersed liquid according to an embodiment of the present invention includes: a conductive material including bundle-type carbon nanotubes; a dispersant including a hydrogenated nitrile-based rubber; and a dispersion medium, where a complex modulus ($|G^*|$ @ 1 Hz) is in a range of 20 to 500 Pa when measured by a rheometer at a frequency of 1 Hz.

In the present invention, a complex modulus or complex shear modulus of a conductive material dispersed liquid, as an amount representing dynamic viscoelasticity, refers to the magnitude of elastic energy accumulated in the material, and becomes smaller as the state of material changes from a solid state to a liquid state. The complex modulus of conductive material dispersed liquid in the present invention may be measured by a viscosity meter, and specifically measured by a rheometer. More specifically, after setting the distance between the circular rotary plates of the rheometer to be constant, the conductive material dispersed liquid having a volume corresponding to the volume to be filled in the corresponding gap is put thereinto, a shear rate is set in the range of $10^{-3}$ to $10^3$ with 1/s as a unit at a frequency of 1 Hz to measure a force generated when the rotary plates are rotated, and thereby the value of shear viscosity may be measured.

Specifically, the conductive material dispersed liquid according to an embodiment of the present invention has a complex modulus ($|G^*|$ @ 1 Hz) of 20 to 500 Pa when measured by a rheometer at a frequency of 1 Hz. When the complex modulus of conductive material dispersed liquid is less than 20 Pa, viscosity of a dispersion liquid is too low, and dispersibility is reduced to such an extent that it is difficult to form electrodes. Further, when a complex modulus exceeds 500 Pa, viscosity of a dispersion liquid becomes high, and thus it is difficult to handle the dispersion liquid due to an increase in pressure in the production process and high viscoelasticity thereof in the preparation of a composition for forming an electrode such that productivity may be reduced due to a decrease in the solid content. Considering the significant effects of improving the dispersibility of the conductive material dispersed liquid from controlling the complex modulus of the conductive material dispersed liquid, which result in a decrease in powder resistance of an electrode produced using the conductive material dispersed liquid and improvement of output characteristics of batteries, the complex modulus of the conductive material dispersed liquid may be specifically in the range of 50 to 350 Pa.

Further, the conductive material dispersed liquid according to an embodiment of the present invention may have a shear viscosity of 2 to 20 Pa·s at a shear rate of 1/6.3 s when measured by a rheometer. As described above, when the conductive material dispersed liquid has a lower shear viscosity than that of conventional liquid, excellent dispersion characteristics may be attained when applied for the production of the electrode. More specifically, the conductive material dispersed liquid may have a shear viscosity of 3.0 to 15 Pa·s.

The physical characteristics of the conductive material dispersed liquid as described above may be realized by controlling the type, physical properties and mixing ratio of the conductive material, the dispersant and the dispersion medium forming the conductive material dispersed liquid.

Further, physical properties of carbon nanotubes may vary depending on the crystallinity, structure and morphology of units forming carbon nanotubes, the structure and morphology of secondary particles formed of the units, etc.

Accordingly, the physical properties required depending on the use of the carbon nanotubes can be obtained by controlling one or a combination of two or more of these factors.

Specifically, in the conductive material dispersed liquid according to an embodiment of the present invention, the conductive material includes bundle-type carbon nanotubes.

The carbon nanotube is a secondary structure formed by aggregating carbon nanotube units such that carbon nanotube units are fully or partially bundled. The carbon nanotube unit has graphite sheets in a cylindrical form with nano-sized diameters and having $sp^2$ bond structures. According to the rolling angles and structures of the graphite sheets, the carbon nanotube units show conductive or semiconductive characteristics. The carbon nanotube units may be classified into single-walled carbon nanotubes (SWCNTs), double-walled carbon nanotubes (DWCNTs), and multi-walled carbon nanotubes (MWCNTs) according to the number of bonds forming walls. The carbon nanotube units have lower resistance as the walls thereof are thinner.

In the conductive material dispersed liquid according to an embodiment of the present invention, the carbon nanotubes may include one or two or more of single-walled, double-walled and multi-walled carbon nanotube.

Further, when the diameter of the carbon nanotube unit as a conductive material for a secondary battery is excessively large, the pore diameter of electrode also greatly increases, thereby reducing electrode density. Further, when the diameter of the carbon nanotube unit is excessively small, dispersion becomes difficult and manufacturing processability of a dispersion liquid decreases, and since dispersed carbon nanotube units or carbon nanotubes are inserted in the space between the electrode active material particles, it is difficult to form sufficient pores.

Accordingly, the average strand diameter of the carbon nanotube unit of carbon nanotubes usable in the present invention may be 30 nm or less, and the average strand diameter of the carbon nanotube unit may be in the range of 10 to 20 nm considering the effect of improving the dispersibility of conductive material and reducing resistance in an electrode from controlling the unit diameter.

Further, the longer the length of the carbon nanotube unit is, the higher the electrical conductivity, strength and electrolyte retention ability of an electrode are. When the length of the carbon nanotube unit is too short, it is difficult to form a conductive path efficiently, and thus there is a concern that electrical conductivity may decrease. Whereas when the length of the carbon nanotube unit is excessively long, there is a concern that dispersibility may be lowered. Accordingly, the length of the unit of carbon nanotubes usable in the present invention may be in the range of 1 to 200 am. Further, in consideration of the diameter of the carbon nanotube unit, the carbon nanotube unit may have an aspect ratio of 5 to 50,000, more specifically 10 to 20,000, which is defined as a ratio of the length (the length of the long axis passing through the center of the unit) to the diameter (the length of the short axis perpendicular to the long axis and passing through the center of the unit) of the carbon nanotube unit.

In the present invention, the strand diameter and length of the carbon nanotube unit may be measured using a field emission scanning electron microscope.

Moreover, carbon nanotubes including the carbon nanotube units may have a ratio (TD/BD ratio) of a true density (TD) to a bulk density (BD) in the range of 70 to 120.

In the present invention, the internal structure of the carbon nanotube may be predicted from the TD/BD ratio. When the TD/BD ratio is excessively high, the content of the carbon nanotube unit in the carbon nanotube is low, and thus capacity characteristics of a battery may be reduced. When the TD/BD ratio is too small, the dispersibility of the carbon nanotubes may be lowered. The TD/BD ratio of the carbon nanotubes usable in the present invention may be, more specifically, in the range of 70 to 100 considering significant improvement effects from controlling the ratio of the bulk density and true density. Further, the true density of the carbon nanotubes usable in the present invention may be in the range of 1,800 to 2,200 $kg/m^3$ under the conditions satisfying the above TD/BD ratio.

Further, in the conductive material dispersed liquid according to an embodiment of the present invention, the bulk density of the carbon nanotubes may be in the range of 10 to 50 $kg/m^3$. When the carbon nanotubes have a bulk density within the above-described range, the conductivity and dispersibility of the carbon nanotubes may be improved.

In the present invention, the bulk density of the carbon nanotubes may be defined by the following Equation 1.

Bulk density $(kg/m^3)$=Weight of carbon nanotubes (kg)/Volume of carbon nanotubes $(m^3)$         [Equation 1]

Further, in the conductive material dispersed liquid according to an embodiment of the present invention, the carbon nanotube has a small unit average diameter as described above, and has a high BET specific surface area due to the high TD/BD ratio, and thus can exhibit excellent dispersibility. Specifically, a BET specific surface area of the carbon nanotubes usable in the present invention may be in the range of 180 to 300 $m^2/g$, and more specifically in the range of 230 to 300 m²/g. In the present invention, the specific surface area of the carbon nanotubes is measured by a BET method. Specifically, the specific surface area of the carbon nanotubes may be calculated from an amount of nitrogen gas adsorbed at a liquid nitrogen temperature (77K) using BELSORP-mini II manufactured by BEL JAPAN, INC.

Further, in the conductive material dispersed liquid according to an embodiment of the present invention, the carbon nanotubes may have an average value in the range of 0.7 to 1.2 of a ratio (ID/IG) of a maximum peak intensity (ID) of a D band at $1,360\pm50$ cm$^{-1}$ to a maximum peak intensity (IG) of a G band at $1,580\pm50$ cm$^{-1}$ obtained by Raman spectroscopy using a laser having a wavelength of 514 nm.

Raman spectroscopy is a method for analyzing the structure of carbon nanotubes, and also is a useful method for analysis of the surface state of carbon nanotubes. The peak in the region around a wavenumber of 1570 to 1580 cm$^{-1}$ in the Raman spectra of carbon nanotubes is called a G band, which is a peak showing an sp$^2$ bond of carbon nanotubes and represents a carbon crystal with no structural defects. Further, the peak in the region around a wavenumber of 1350 to 1360 cm$^{-1}$ in the Raman spectra of carbon nanotubes is called a D band, which is a peak showing an sp$^3$ bond of carbon nanotubes and increases when the atomic bond formed by the sp$^2$ bond is broken and becomes the sp$^3$ bond. Since the D band increases when disorder or defects present in the carbon nanotubes, or amorphous are generated, the degree of generated disorder or defects may be quantitatively evaluated by calculating the ratio (ID/IG) of the maximum peak intensity (ID) of the D band to the maximum peak intensity (IG) of the G band.

In the present invention, the G band of Raman spectra for carbon nanotubes may be a peak in the region of the wavenumber of $1,580\pm50$ cm$^{-1}$, and more specifically 1,575 to 1,600 cm$^{-1}$, and the D band may be a peak in the region of the wavenumber of $1,360\pm50$ cm$^{-1}$, and more specifically 1,340 to 1,360 cm$^{-1}$. The wavenumber range for the G band and D band corresponds to a range that may be shifted according to a laser light source used in Raman spectroscopy. The Raman values used in the present invention are not particularly limited, and may be measured at a laser wavelength of 514 nm using a DXR Raman microscope (Thermo Electron Scientific Instruments LLC).

Generally, the larger the ratio of a G band peak integral and a D band peak integral is, the larger the amount of amorphous carbon is or the poorer the crystallinity of the carbon nanotube is, but in the present invention, since the BET specific surface area of carbon nanotubes is increased and carbon nanotubes have a secondary shape with a bundle structure, carbon nanotubes have excellent crystallinity and have the average value of ID/IG as described above.

Further, the carbon nanotubes may include metal elements in an amount of 50 ppm or less, more specifically 5 ppm or less, which are derived from a main catalyst or a cocatalyst such as Co, Mo, V, or Cr used in the preparation process. As such, when the content of metal as a residual impurity in the carbon nanotubes is remarkably reduced, better conductivity can be exhibited without concern for side reactions in the electrode. In the present invention, the content of residual metal impurities in the carbon nanotubes may be analyzed using high frequency inductively coupled plasma (ICP). Further, the carbon nanotubes may include no iron group metal.

Further, the carbon nanotubes have excellent electrical conductivity, and specifically, have a volume resistance of 0.01 Ω·cm or less, and more specifically 0.0001 to 0.009 Ω·cm at a pressure of 62 MPa.

In the present invention, for the volume resistance of carbon nanotubes, carbon nanotubes were filled in an insulating mold with a diameter of 1 mm and pressed to measure the current and voltage of a surface using four probes, and a volume resistance at a pressure of 62 MPa was calculated by applying a correction factor.

The carbon nanotubes as described above may be commercially obtained and used, or may be directly prepared and used. When the carbon nanotubes are prepared, the carbon nanotubes may be prepared by a conventional method such as an arc discharge method, a laser evaporation method, or a chemical vapor deposition method. The above-described physical properties may be realized by controlling the type of catalyst, heat treatment temperature, impurity removal method, etc.

Specifically, when carbon nanotubes are prepared by a chemical vapor phase synthesis method, the carbon nanotubes may be prepared by a method which includes a step of contacting a carbon source under heating with a supported catalyst in which a metal catalyst is supported on a spherical t-alumina support, and a step of selectively removing metal impurities in carbon nanotubes as necessary.

More specifically, preparation of carbon nanotubes according to the chemical vapor phase synthesis method may be performed by introducing the supported catalyst into a fixed-bed reactor or a fluidized-bed reactor, and then injecting a carbon source, or a mixed gas of the carbon source, a reducing gas (e.g., hydrogen and the like) and a carrier gas (e.g., nitrogen) thereinto at a temperature not lower than the pyrolysis temperature of the gaseous carbon source and not higher than the melting point of the supported metal catalyst, and decomposing the carbon source to grow carbon nanotubes by the chemical vapor phase synthesis method. The carbon nanotubes prepared by the chemical vapor phase synthesis method have a crystal growth direction almost parallel to the longitudinal direction of the carbon nanotube unit and high crystallinity of the graphite structure in the longitudinal direction of the carbon nanotube unit. As a result, the unit has a small diameter, and high electric conductivity and strength.

Further, the preparation of the carbon nanotubes may be performed at a temperature of 500° C. or more and less than 800° C., and more specifically, 550 to 700° C. Within the-above-described reaction temperature range, the generation of amorphous carbon is minimized, and the weight is lowered while minimizing the generation of amorphous carbon and maintaining the bulk size of the carbon nanotubes prepared, and thus the dispersibility according to the reduction of bulk density can be further improved. As a heat source for the heating process, induction heating, radiant heat, laser, IR, microwave, plasma, surface plasmon heating and the like may be used.

Further, carbon may be supplied as a carbon source in the preparation of the carbon nanotubes, and any carbon source may be used without particular limitation as long as it can be present in a gas phase at a temperature of 300° C. or more. More specifically, the carbon source may be a carbon-based compound having 6 or less carbon atoms, and more specifically, examples thereof include carbon monoxide, methane, ethyl, ethylene, ethanol, acetylene, propane, propylene, butane, butadiene, pentane, pentene, cyclopentadiene, hexane, cyclohexane, benzene, toluene and the like, and one or a mixture of two or more thereof may be used.

A cooling process for arranging the carbon nanotube more regularly may be further performed after carbon nanotube units are grown by the heating process as described above. Specifically, the cooling process may be performed by natural cooling according to removal of a heat source, or using a cooling device.

Further, the supported catalyst used in the preparation of the conductive material may be a catalyst in which a metal catalyst is supported on spherical α-alumina support.

The α-alumina has very low porosity as compared with γ-alumina and has low utility value as a catalyst support. However, when a calcination temperature at which the supported catalyst is formed is controlled, it is possible to increase the diameter of carbon nanotubes by reducing the specific surface area of carbon nanotubes while suppressing the generation of amorphous carbon in the synthesis of carbon nanotubes using the α-alumina. Moreover, the bulk density of carbon nanotubes may be reduced to improve dispersibility Specifically, the α-alumina usable as a support in the present invention may have an average particle diameter ($D_{50}$) in the range of 20 to 200 μm, and may have a BET specific surface area in the range of 1 to 50 $m^2/g$. Further, the α-alumina may have a smooth surface with very low porosity, and specifically, a porosity in the range of 0.001 to 0.1 $cm^3/g$.

Further, the supported catalyst including the spherical α-alumina as a support may be prepared by supporting a metal catalyst on the spherical α-alumina support followed by calcination. Specifically, the supported catalyst may be prepared by adding the spherical α-alumina support to a metal catalyst precursor solution prepared by dissolving the precursor of the metal catalyst in water, mixing, and then performing calcination at a temperature of 700° C. or less.

The metal catalyst supported on the support serves to help carbon components present in a gaseous carbon source bind to each other to form a 6-membered ring structure. As the metal catalyst, a main catalyst such as iron, nickel or cobalt may be used alone or the main catalyst may be used in the form of a main catalyst-cocatalyst composite catalyst together with a co-catalyst such as molybdenum, vanadium or chromium. Specifically, the composite catalyst may be FeCO, CoMo, CoV, FeCoMo, FeMoV, FeV, FeCoMoV and the like, and one or a mixture of two or more thereof may be used. Further, the cocatalyst may be used in an amount of 0.01 to 1 mol, and specifically 0.05 to 0.5 mol based on 1 mol of the main catalyst.

As the precursor of the metal catalyst which may be used in the preparation of the supported catalyst, a metal salt or metal oxide soluble in water may be used. Specifically, the precursor of the metal catalyst may be a metal salt, a metal oxide or a metal halide including one or two or more metal elements selected from Fe, Ni, Co, Mo, V and Cr, and one or a mixture of two or more thereof may be used. More specifically, one or a mixture of two or more selected from the group consisting of $Fe(NO_3)_2 \cdot 9H_2O$, $Co(NO_3)_2 \cdot 6H_2O$, $Co_2(CO)_8$, $[Co_2(CO)_6(t-BuC=CH)]$, $Cu(OAc)_2$, $Ni(NO_3)_2 \cdot 6H_2O$, $(NH_4)_6Mo_7O_{24} \cdot 4H_2O$, $Mo(CO)_6$, $(NH_4)MoS_4$ and $NH_4VO_3$ may be used.

Further, the precursor of the metal catalyst may be used in the form of an aqueous solution dissolved in water. Here, the concentration of the metal catalyst precursor in the aqueous solution may be suitably controlled in consideration of impregnation efficiency and the like. Specifically, the concentration of the metal catalyst precursor in the aqueous solution may be in the range of 0.1 to 0.6 g/ml.

Further, the content of the spherical α-alumina support mixed with the precursor of the metal catalyst may be suitably determined in consideration with the content of the support in the supported catalyst to be finally prepared.

Further, an acid may selectively be further used in the addition and mixing of the support in the metal catalyst precursor solution for controlling the bulk density of the carbon nanotubes to be finally prepared. As such, when the acid is further added, the metal catalyst precursor solution may be used in an amount of 3 to 40 mol, and more specifically 5 to 30 mol based on 1 mol of the acid. The acid may specifically be citric acid and the like, and one or a mixture of two or more thereof may be used.

Further, a process of mixing the metal catalyst precursor solution and the spherical α-alumina support may be performed according to a conventional method, and specifically, may be performed by rotation or stirring at a temperature in the range of 45 to 100° C.

Further, during the mixing process, the metal catalyst precursor and the support may be mixed in consideration of the content of the metal catalyst in the supported catalyst to be finally prepared. As the amount of the metal catalyst supported in the supported catalyst increases, the bulk density of the carbon nanotubes prepared using the supported catalyst tends to increase. Accordingly, the metal catalyst may be mixed such that the metal catalyst is supported in an amount of 5 to 30 wt % based on the total weight of the supported catalyst to be finally prepared, considering the bulk density of the carbon nanotubes prepared.

Further, after the metal catalyst precursor solution and the spherical α-alumina support are mixed, a drying process may selectively be performed before the subsequent calcination process. The drying process may be carried out according to a conventional method, specifically, may be carried out by rotary evaporation at a temperature in the range of 40 to 100° C. under vacuum for 3 minutes to 1 hour.

Subsequently, calcination is performed on the mixture of the metal catalyst precursor and the support prepared in the aforementioned manner. The calcination may be carried out at a temperature of 700° C. or less, and specifically in the range of 400 to 700° C. in air or an inert atmosphere.

Further, after the drying process and before the calcination process, a preliminary calcination process may selectively be further carried out at a temperature in the range of 250 to 400° C.

Here, considering the efficiency of the reaction, up to 50% of the mixture of the metal catalyst precursor and the support may be impregnated into the α-alumina support and used immediately before the preliminary calcination process, and the remainder of the mixture immediately after the preliminary calcination process may be impregnated into the α-alumina support and used.

Further, in the method of preparing a conductive material according to an embodiment of the present invention, the metal impurity removal process may be performed according to a conventional method such as washing and acid treatment. The bundle-type carbon nanotubes prepared according to the above-described preparation method may exhibit excellent dispersibility and conductivity when preparing the conductive liquid. Moreover, since the bundle-type carbon nanotubes have high purity to increase the conductivity in the electrode, the performance of the battery, particularly the output characteristics of the battery can be improved when being applied to a battery.

Further, in the conductive material dispersed liquid according to an embodiment of the present invention, the dispersant may be a partially or wholly hydrogenated nitrile-based rubber, and more specifically, may be a hydrogenated nitrile-based rubber including a repeating unit of a structure derived from a conjugated diene, a repeating unit of a structure derived from a hydrogenated conjugated diene and a repeating unit of a structure derived from an α,β-unsaturated nitrile. Here, the hydrogenated nitrile-based rubber may selectively further include additional copolymerizable comonomers.

The hydrogenated nitrile-based rubber may be prepared by copolymerizing α,β-unsaturated nitriles, conjugated dienes and selectively other copolymerizable comonomers, and hydrogenating C=C double bonds in the copolymer thus prepared. Here, the polymerization reaction process and hydrogenation process may be carried out according to a conventional method.

Specific examples of the α,β-unsaturated nitrile usable in the preparation of the hydrogenated nitrile-based rubber include acrylonitrile, methacrylonitrile and the like, and one or a mixture of two or more thereof may be used.

Further, specific examples of other conjugated dienes usable in the preparation of the hydrogenated nitrile-based rubber include conjugated dienes having 4 to 6 carbon atoms such as 1,3-butadiene, isoprene, 2,3-methylbutadiene and the like, and one or a mixture of two or more thereof may be used.

Further, specific examples of the copolymerizable comonomers which may selectively be used include aromatic vinyl monomers (e.g., styrene, α-methyl styrene, vinyl pyridine, fluoroethyl vinyl ether, etc.), α,β-unsaturated carboxylic acids (e.g., acrylic acid, methacrylic acid, maleic acid, fumaric acid, etc.), esters or amides of α,β-unsaturated carboxylic acids (e.g., methyl (meth)acrylate, ethyl (meth)acrylate, n-dodecyl (meth)acrylate, methoxymethyl (meth)acrylate, hydroxyethyl (meth)acrylate, or polyethylene glycol (meth)acrylate, etc.), anhydrides of α,β-unsaturated dicarboxylic acids (e.g., maleic anhydride, itaconic anhydride, citraconic anhydride, etc.), but are not limited thereto.

In the hydrogenated nitrile-based rubber prepared according to the aforementioned method, the content ratio of a repeating unit of a structure derived from an α,β-unsaturated nitrile, a repeating unit of a structure derived from a conjugated diene, a repeating unit of a structure derived from a hydrogenated conjugated diene and a selectively used repeating unit of a structure derived from other copolymerizable comonomers may vary within a wide range, but the total sum of the structural units is 100 wt % in each case.

Specifically, considering the improvement of dispersibility of carbon nanotubes and the miscibility with the dispersion medium, the content of the repeating unit of a structure derived from an α,β-unsaturated nitrile in the hydrogenated nitrile-based rubber may be in the range of 10 to 60 wt %, and specifically in the range of 20 to 60 wt % based on the total weight of the rubber. When the repeating unit of a structure derived from an α,β-unsaturated nitrile is contained in the aforementioned amount, the dispersibility of carbon nanotubes can be increased, and thus high conductivity can be imparted even when the amount of the carbon nanotubes to be added is small.

In the present invention, the content of the repeating unit of a structure derived from an α,β-unsaturated nitrile in the hydrogenated nitrile-based rubber is the weight ratio of the repeating unit of a structure derived from an α,β-unsaturated nitrile with respect to the total weight of the rubber, and the measurement of the content is performed by obtaining a median of the values obtained by measuring the amount of nitrogen generated, converting the bonding amount from the molecular weight of acrylonitrile, and quantifying in accordance with the mill oven method of JIS K 6364.

Further, the hydrogenated nitrile-based rubber may include the repeating unit of a structure derived from a hydrogenated conjugated diene in an amount of 1 to 15 wt %, and more specifically at 5 to 15 wt % based on the total weight of the rubber. When the structure derived from a hydrogenated conjugated diene is contained in the aforementioned amount, the miscibility with the dispersion medium is increased and the dispersibility of carbon nanotubes can be increased.

Further, when the hydrogenated nitrile-based rubber further includes additional other copolymerizable comonomers, the content ratio may vary depending on the type and properties of the comonomers, and specifically, the content of the repeating unit of a structure derived from the comonomers may be 20 wt % or less, and more specifically in the range of 1 to 10 wt % based on the total weight of the hydrogenated nitrile-based rubber.

More specifically, the hydrogenated nitrile-based rubber may be an acrylonitrile-butadiene rubber (H—NBR) including the repeating unit of a structure derived from acrylonitrile of the following Formula 1, the repeating unit of a structure derived from butadiene of the following Formula 2, and the repeating unit of a structure derived from hydrogenated butadiene of the following Formula 3. Here, the content of the repeating unit of a structure derived from acrylonitrile of the following Formula 1 may be in the range of 10 to 60 wt %, and more specifically in the range of 20 to 60 wt %. Further, the content of the repeating unit of a structure derived from hydrogenated butadiene of the following Formula 3 may be in the range of 1 to 15 wt %, and more specifically in the range of 5 to 15 wt %.

[Formula 1]

[Formula 2]

[Formula 3]

Further, the weight average molecular weight of the hydrogenated nitrile-based rubber may be in the range of 10,000 to 700,000 g/mol, and more specifically in the range of 10,000 to 300,000 g/mol. Further, the hydrogenated nitrile-based rubber may have a polydispersity index (PDI, the ratio of Mw/Mn, Mw is a weight average molecular weight, and Mn is a number average molecular weight) in the range of 2.0 to 6.0, and specifically in the range of 2.0 to 4.0. When the hydrogenated nitrile-based rubber has a weight average molecular weight and a polydispersity index within the above-described ranges, carbon black may be uniformly dispersed in the dispersion medium. In the present invention, each of the weight average molecular weight and the number average molecular weight of the hydrogenated nitrile-based rubber is a polystyrene-equivalent molecular weight analyzed by gel permeation chromatography (GPC).

Further, in the conductive material dispersed liquid according to an embodiment of the present invention, examples of the dispersion medium include amide-based polar organic solvents such as dimethylformamide (DMF), diethylformamide, dimethylacetamide (DMAc), N-methylpyrrolidone (NMP) and the like; alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol and the like; glycols such as ethylene glycol, diethylene glycol, triethylene glycol, propylene glycol, 1,3-propanediol, 1,3-butanediol, 1,5-pentanediol, hexylene glycol and the like; polyhydric alcohols such as glycerin, trimethylol propane, pentaerythritol, sorbitol and the like; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether and the like; ketones such as acetone, methyl ethyl ketone, methyl propyl ketone, cyclopentanone and the like; esters such as ethyl acetate, γ-butyl lactone, ε-propiolactone and the like, and one or a mixture of two or more thereof may be used.

More specifically, the dispersion medium may be an amide-based polar organic solvent considering the effect of improving the dispersibility of the carbon nanotubes and the dispersant.

In the conductive material dispersed liquid having the above-described structure according to an embodiment of the present invention, the contents of the dispersant, carbon black and dispersion medium may be suitably determined depending on the use of the dispersion liquid.

Specifically, the dispersant may be contained in an amount of 1 to 50 parts by weight, and more specifically 10 to 50 parts by weight based on 100 parts by weight of the carbon nanotubes in order to uniformly disperse the carbon nanotubes in the dispersion liquid. When the content of the dispersant is less than 1 part by weight, it is difficult to uniformly disperse the carbon nanotubes in the dispersed liquid. When the content of the dispersant exceeds 50 parts by weight, viscosity of the dispersion liquid is increased, and the workability may be lowered.

Further, the carbon nanotubes may be included in an amount of 1 to 30 wt %, and more specifically 1 to 5 wt % based on the total weight of the conductive material dispersed liquid. When the carbon nanotubes are included in an amount within the above-described range, electronic conductivity and dispersibility can be well balanced. When the content of carbon nanotubes is out of the above range and is less than 1 wt %, for example, the composition for forming an electrode includes a large amount of organic solvent while being used to prepare an electrode of a lithium secondary battery, and as a result, pores in the electrode are increased, the filling rate of the active material is lowered, and thereby battery capacity may decrease. Further, a drying time for removing the organic solvent may be prolonged. Moreover, when the content of carbon nanotubes exceeds 30 wt %, mixing dispersibility of carbon black may be reduced.

More specifically, the conductive material dispersed liquid according to an embodiment of the present invention may include the dispersant in an amount of 1 to 50 parts by weight and the dispersion medium in an amount of 200 to 9,900 parts by weight based on 100 parts by weight of the carbon nanotubes. Within the above-described ranges, carbon nanotubes may be uniformly dispersed in the dispersion medium. When a mixing ratio is as described above, a more improved effect can be exhibited Further, the conductive material dispersed liquid according to an embodiment of the present invention may further include a dispersion stabilizer to increase stability of the dispersion liquid.

The dispersion stabilizer is adsorbed onto the surface of carbon black to exhibit a lapping effect surrounding the carbon nanotubes, thereby preventing aggregation of the carbon nanotubes. Accordingly, the dispersion stabilizer is preferably excellent in affinity with carbon nanotubes and excellent in miscibility with dispersants and dispersion media.

Specifically, in the conductive material dispersed liquid according to an embodiment of the present invention, the dispersion stabilizer may be fluorinated polymers such as polyvinylidene fluoride or polyvinylpyrrolidone, and one or a mixture of two or more thereof may be used.

Further, the dispersion stabilizer may have a weight average molecular weight in the range of 20,000 to 5,000,000 g/mol. When the molecular weight of the dispersion stabilizer is too small and is less than 20,000 g/mol, it is difficult for the dispersion stabilizer to have a sufficient lapping effect on the carbon nanotubes. When the molecular weight is too large and is more than 5,000,000 g/mol, it is difficult to sufficiently lap the carbon nanotubes due to a decrease in molecular motion of the dispersion stabilizer in the dispersion medium. More specifically, the dispersion stabilizer may have a weight average molecular weight in the range of 70,000 to 2,000,000 g/mol.

Further, the dispersion stabilizer may be used in an amount of 1 to 10 parts by weight based on 100 parts by weight of the carbon nanotubes. When the content of the dispersion stabilizer is too low in comparison with the content of the carbon nanotubes, it is difficult to obtain a sufficient lapping effect, and as a result, aggregation of carbon nanotubes may occur.

The conductive material dispersed liquid according to an embodiment of the present invention which has the above-described structure may be prepared by a preparation method including mixing a conductive material which includes bundle-type carbon nanotubes, a dispersant and a dispersion medium, and then milling such that a complex modulus ($|G^*|$ @ 1 Hz) is in a range of 20 to 500 Pa when measured by a rheometer at a frequency of 1 Hz. Here, the type and use amount of the carbon nanotubes, the conductive material which includes the carbon nanotubes, the dispersant and the dispersion medium are the same as described above.

Mixing of the conductive material, dispersant and dispersion medium may be carried out by conventional methods. Specifically, cavitation dispersion treatment may be carried out to improve the mixing property of the carbon nanotubes and dispersion medium or the dispersibility of carbon nanotubes in the dispersion medium. The cavitation dispersion treatment is a dispersion treatment method using a shock wave generated by the rupture of vacuum bubbles formed in water when high energy is applied to a liquid, and the carbon nanotubes may be dispersed without deterioration of the properties of the carbon nanotubes by the above-described method. Specifically, the cavitation dispersion treatment may be carried out by an ultrasonic wave, a jet mill, or shear dispersion treatment.

The dispersion treatment process may be suitably performed depending on the amount of the carbon nanotubes and the type of the dispersant. Specifically, when the ultrasonic treatment is performed, the frequency may be in the range of 10 to 150 kHz, the amplitude may be in the range of 5 to 100 am, and the irradiation time may be in the range of 1 to 300 minutes. As the ultrasonic wave generating apparatus for performing the ultrasonic treatment process, for example, an ultrasonic homogenizer may be used. Further, when a jet mill process is carried out, the pressure may be 20 to 250 MPa, and this process may be carried out one time or more, specifically, a plurality of times, twice or more. Further, as the jet mill dispersing apparatus, a high pressure wet jet mill and the like may be used.

The temperature during the cavitation dispersion treatment process is not particularly limited, and the cavitation dispersion treatment may be performed at a temperature at which there is no possibility of a change in viscosity of the dispersion liquid due to evaporation of the dispersion medium. Specifically, the cavitation dispersion treatment may be performed at a temperature of 50° C. or less, and more specifically, at a temperature in the range of 15 to 50° C.

Further, in the preparation of the conductive material dispersed liquid according to an embodiment of the present invention, milling may be performed by a milling method such as ball milling, bead milling, basket milling and the like, and more specifically, a milling method using a bead mill. Here, the size of the bead mill may be suitably determined according to the type and amount of the conductive material and the type of the dispersant, and specifically, the average diameter of the bead mill may be in the range of 0.5 to 2 mm.

The milling process may be performed under the condition in which the complex modulus of the conductive material dispersed liquid satisfies the above-described condition, and specifically, may be performed for 90 to 120 minutes.

Further, a dispersion stabilizer may selectively be further used in the preparation of the dispersion liquid, and the dispersion stabilizer may be added together during the process of mixing with the dispersant. In this case, the method of preparing the conductive material dispersed liquid according to an embodiment of the present invention may further include a process of adding a dispersion stabilizer. The type and use amount of the dispersion stabilizer are as described above.

According to the above-described preparation method, a dispersion liquid in which carbon nanotubes are uniformly dispersed in the dispersion medium may be prepared.

Specifically, in the conductive material dispersed liquid according to an embodiment of the present invention, the carbon nanotubes and dispersant may be dispersed and included in the form of a carbon nanotubes-dispersant composite in which the dispersant is introduced to the surface of the carbon nanotube through a physical or chemical bond.

More specifically, the composite in the conductive material dispersed liquid may be distributed such that particle size distribution ($D_{99}$) is 50 μm or less, and more specifically in the range of 20 to 50 μm.

The particle size distribution ($D_{99}$) of the composite may be defined as a particle size on the basis of 99% in the particle size distribution. Further, the particle size distribution ($D_{99}$) of the composite may be measured using, for example, a laser diffraction method, and more specifically, the composite may be dispersed in a solvent and then introduced into a commercially available laser diffraction particle size analyzer (e.g., Microtrac MT 3000) to irradiate ultrasound of about 28 kHz at an output of 60 W, and then the average particle size ($D_{99}$) on the basis of 99% in the particle size distribution in the measuring device may be calculated.

Further, in the conductive material dispersed liquid according to an embodiment of the present invention, the solid content including the composite may be in the range of 1.0 to 5.0 wt % based on the total weight of the dispersion liquid. As such, the conductive material dispersed liquid according to an embodiment of the present invention can exhibit excellent dispersibility of a conductive material despite having a higher solid content than that of the conventional conductive material dispersed liquid.

As such, the conductive material dispersed liquid according to the present invention can exhibit excellent electrical, thermal and mechanical properties due to uniform dispersion of carbon nanotubes, and workability is improved due to maintenance of low viscosity, and thus the conductive material dispersed liquid may be applied and practically used in various fields. Specifically, the conductive material dispersed liquid may be used for production of electrodes for secondary batteries.

According to still another embodiment of the present invention, there are provided a composition for forming an electrode for a secondary battery which includes the above-described conductive material dispersed liquid together with an electrode active material, and an electrode produced using the composition.

In the composition for forming an electrode, the electrode active material may be generally used as a positive electrode or negative electrode active material of a secondary battery.

Specifically, when the composition for forming an electrode is for a composition for forming a positive electrode, the electrode active material is a compound capable of reversibly intercalating and deintercalating lithium (a lithiated intercalation compound), and specifically, may be a positive electrode active material of a lithium transition metal oxide including a transition metal such as cobalt, manganese, nickel, or aluminum, and lithium.

More specifically, examples of the positive electrode active material include lithium-manganese-based oxides such as $LiMnO_2$, $LiMn_2O$ and the like, lithium-cobalt-based oxides such as $LiCoO_2$, lithium-nickel-based oxides such as $LiNiO_2$, lithium-nickel-manganese-based oxides such as $LiNi_{1-Y}Mn_YO_2$ (where $0<Y<1$), $LiMn_{2-Z}Ni_ZO_4$ (where $0<Z<2$) and the like, lithium-nickel-cobalt-based oxides such as $LiNi_{1-Y}Co_YO_2$ (where $0<Y<1$) and the like, lithium-manganese-cobalt-based oxides such as $LiCo_{1-Y}Mn_YO_2$ (where $0<Y<1$), $LiMn_{2-Z}Co_ZO_4$ (where $0<Z<2$) and the like, lithium-nickel-manganese-cobalt-based oxides such as $Li(Ni_PCo_QMn_R)O_2$ (where $0<P<1$, $0<Q<1$, $0<R<1$ and $P+Q+R=1$), $Li(Ni_PCo_QMn_R)O_4$ (where $0<P<2$, $0<Q<2$, $0<R<2$ and $P+Q+R=2$) and the like, oxides of lithium-nickel-cobalt-transition metal (M) such as $Li(Ni_PCo_QMn_RMS)O_2$ (where M is selected from the group consisting of Al, Fe, V, Cr, Ti, Ta, Mg and Mo, and P, Q, R and S each independently represent atom fractions of elements, $0<P<1$, $0<Q<1$, $0<R<1$, $0<S<1$ and $P+Q+R+S=1$), etc. Further, the lithium transition metal oxide may be doped with tungsten (W) and the like. Among these, in terms of improving the capacity characteristics and stability of the battery, the positive electrode active material may be $LiCoO_2$, $LiMnO_2$, $LiNiO_2$, a lithium nickel manganese cobalt oxide (e.g., $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$ and the like), a lithium nickel cobalt aluminum oxide (e.g., $LiNi_{0.8}Co_{0.15}Al_{0.05}O_2$ and the like), etc. Among these, in terms of improving the capacity characteristics and stability of the battery, the positive electrode active material may be $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$, $LiNi_{0.8}Mn_{0.1}Co_{0.1}O_2$ and the like, and one or a mixture of two or more thereof may be used.

Further, when the composition for forming an electrode is for a composition for forming a negative electrode, the electrode active material is a compound capable of reversibly intercalating and deintercalating lithium, and may be a negative electrode active material of carbonaceous materials such as artificial graphite, natural graphite, graphitized carbon fiber and amorphous carbon; metal compounds capable of alloying with lithium, such as Si, Al, Sn, Pb, Zn, Bi, In, Mg, Ga, Cd, Si alloys, Sn alloys or Al alloys; a metal oxide capable of doping and dedoping lithium such as $SiO_x$ (0<x<2), $SnO_2$, vanadium oxide and lithium vanadium oxide; or composites including the metal compound and the carbonaceous material such as a Si—C composite or a Sn—C composite, and one or a mixture of two or more thereof may be used. Further, a metal lithium thin film may be used as the negative electrode active material. Further, both low-crystalline carbon and highly-crystalline carbon may be used as the carbon material. Typical examples of the low-crystalline carbon include soft carbon and hard carbon, and typical examples of the highly-crystalline carbon include amorphous, platy, scaly, spherical and fibrous natural graphite and artificial graphite, kish graphite, pyrolytic carbon, mesophase pitch based carbon fiber, meso-carbon microbeads, mesophase pitches, and high-temperature sintered carbon such as petroleum- or coal tar pitch-derived cokes.

The electrode active material may be contained in an amount of 70 to 99.5 wt % with respect to the total weight of the composition for forming an electrode based on the solid content. When the content of the electrode active material is less than 70 wt %, the capacity may decrease. When the content exceeds 99.5 wt %, adhesive strength to an electrode current collector decreases, and conductivity is reduced due to a decrease in the relative content of the binder and the conductive material.

Further, the composition for forming an electrode may include a binder to enhance adhesion between the electrode active material particles and adhesive strength between the electrode active material and the current collector.

Specific examples of the binder include polyvinylidene fluoride (PVDF), a polyvinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, or various copolymers thereof, and one or a mixture of two or more thereof may be used. The binder may be included in an amount of 1 to 30 wt % based on the total weight of the composition for forming an electrode.

Further, the composition for forming an electrode may further include a solvent for mixing and dispersing the above-described electrode active material, binder, and the like.

The solvent may be any solvent commonly used in the related field, and examples thereof include dimethyl sulfoxide (DMSO), isopropyl alcohol, N-methylpyrrolidone (NMP), acetone, water and the like, and one or a mixture of two or more thereof may be used. The amount of the solvent used may be sufficient to achieve a viscosity capable of exhibiting excellent thickness uniformity when the electrode active material and the binder are dissolved or dispersed, and then applied to produce an electrode, in consideration of the application thickness of the slurry and the production yield.

Further, the electrode according to an embodiment of the present invention, which is prepared by using the composition for forming an electrode, may be a positive electrode or a negative electrode, and more specifically, may be a positive electrode.

The electrode may be prepared using a conventional method except for forming the electrode active material layer using the composition for forming an electrode. Specifically, the electrode may be produced by applying the composition for forming an electrode on a current collector and drying, or laminating a film obtained by casting the composition for forming an electrode on a separate support and then peeling off the composition from the support on a current collector.

The current collector is not particularly limited as long as it has electrical conductivity without causing chemical changes in the battery, and examples thereof include copper, stainless steel, aluminum, nickel, titanium, sintered carbon, or aluminum or stainless steel having a surface treated with carbon, nickel, titanium, silver and the like. Further, the current collector may generally have a thickness in the range of 3 to 500 m, and adhesive strength of the positive electrode active material can be increased by forming fine irregularities on the surface of the current collector. For example, the current collector may be used in various forms such as a film, a sheet, a foil, a net, a porous material, a foam, a nonwoven fabric, etc.

According to yet another embodiment of the present invention, there is provided an electrochemical device including the electrode. Specifically, the electrochemical device may be batteries, capacitors, and the like, and more specifically, may be a lithium secondary battery.

Specifically, the lithium secondary battery includes a positive electrode, a negative electrode positioned opposite the positive electrode, a separator interposed between the positive electrode and the negative electrode, and an electrolyte. At least one of the positive electrode and the negative electrode may be prepared using the composition for forming an electrode including the conductive material dispersed liquid. Further, the lithium secondary battery may selectively further include a battery container for storing an electrode assembly including the positive electrode, negative electrode, and separator, and a sealing component for sealing the battery container.

Further, in the lithium secondary battery, a separator separates the negative electrode and the positive electrode and provides a passage for lithium ions. Any separator may be used without particular limitation as long as it is used as a separator in a lithium secondary battery, and particularly, a separator having low resistance to electrolyte ion migration and excellent electrolyte wettability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a laminated structure of two or more thereof may be used. Further, nonwoven fabrics formed of conventional porous nonwoven fabrics such as high-melting-point glass fibers, polyethylene terephthalate fibers and the like may be used. Furthermore, a coated separator containing a ceramic component or a polymer material may be used to ensure heat resistance or mechanical strength, and may be selectively used in a single layer or a multi-layer structure.

Further, examples of the electrolyte used in the present invention include organic liquid electrolytes, inorganic liquid electrolytes, solid polymer electrolytes, gel-type polymer electrolytes, solid inorganic electrolytes, molten inorganic electrolytes and the like which are usable in the production of lithium secondary batteries, but are not limited thereto.

Specifically, the electrolyte may include organic solvents and lithium salts.

As the organic solvent, any organic solvent may be used without particular limitation as long as it can act as a medium through which ions involved in the electrochemical reaction of the battery can move. Specific examples of the organic solvent include ester-based solvents such as methyl acetate, ethyl acetate, γ-butyrolactone, ε-caprolactone and the like; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), propylene carbonate (PC) and the like; alcohol-based solvents such as ethyl alcohol and isopropyl alcohol; nitriles such as R—CN (R is a linear, branched or cyclic hydrocarbon group having 2 to 20 carbon atoms, which may include a double bond aromatic ring or ether bond); amides such as dimethylformamide; dioxolanes such as 1,3-dioxolane; sulfolane, etc. Among these, a carbonate-based solvent is preferred, and a mixture of a cyclic carbonate (e.g., ethylene carbonate or propylene carbonate) having high ionic conductivity and a high dielectric constant capable of increasing the charging/discharging performance of the battery and a linear carbonate-based compound having low viscosity (e.g., ethylmethyl carbonate, dimethyl carbonate or diethyl carbonate) is more preferred. In this case, when a cyclic carbonate and a chain carbonate are mixed in a volume ratio of about 1:1 to 1:9, the performance of the electrolyte may be excellent.

The lithium salt may be used without particular limitation as long as it is a compound capable of providing lithium ions used in a lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, etc. The concentration of the lithium salt used is preferably in the range of 0.1 to 2.0 M. When the concentration of the lithium salt is within the above-described range, the electrolyte has suitable conductivity and viscosity, and thus can exhibit excellent electrolyte performance and allow lithium ions to move efficiently.

In addition to the electrolyte compositions, for example, the electrolyte may include one or more additives such as a haloalkylene carbonate-based compound such as difluoroethylene carbonate, pyridine, triethylphosphite, triethanolamine, cyclic ethers, ethylenediamine, n-glyme, hexamethylenetetramine, nitrobenzene derivatives, sulfur, quinone imine dyes, N-substituted oxazolidinones, N,N-substituted imidazolidine, ethylene glycol dialkyl ether, ammonium salts, pyrrole, 2-methoxyethanol, aluminum trichloride and the like, for the purpose of improving the lifetime characteristics of a battery, suppressing the reduction of battery capacity, and improving the discharge capacity of the battery. Here, the additive may be included in an amount of 0.1 to 5 wt % based on the total weight of the electrolyte.

A lithium secondary battery including an electrode produced using the conductive material dispersed liquid according to the present invention as described above can stably exhibit excellent discharge capacity, output characteristics and an excellent capacity retention ratio due to uniform dispersion of the conductive material in the electrode. As a result, the lithium secondary battery is useful in the fields of portable devices such as cellular phones, notebook computers, digital cameras and the like, and electric vehicles such as hybrid electric vehicles (HEV).

Therefore, according to yet another embodiment of the present invention, there are provided a battery module including the lithium secondary battery as a unit cell and a battery pack including the battery module.

The battery module or battery pack may be used as a power supply in one or more of medium- to large-sized devices such as a power tool; electric cars including an electric vehicle (EV), a hybrid electric vehicle, and a plug-in hybrid electric vehicle (PHEV); or a power storage system.

MODES OF THE INVENTION

Now, the present invention will be described in more detail with reference to the following examples. These examples are provided only for illustration of the present invention and should not be construed as limiting the scope and spirit of the present invention.

Preparation Example 1: Preparation of Carbon Nanotubes 2,424 g of $Co(NO_3)_2.6H_2O$ and $NH_4VO_3$ (Co/V, a molar ratio of 10:1) as precursor materials of Co and V was added to 2,000 ml of water, and thereby a clear aqueous solution was prepared in a flask A. Separately, 2,000 g of an α-alumina support obtained by primary calcination of aluminum hydroxide ($Al(OH)_3$) as an aluminum-based support precursor at 500° C. for 4 hours was prepared in a flask B. 4,424 g of the flask A solution was added to the flask B such that Co/V (a molar ratio of 10:1) was 30 mol based on 100 mol of the alumina support when 2,000 g of the α-alumina support was converted into 100 on a molar basis.

After citric acid was added such that Co was 23 mol with respect to 1 mol of citric acid, and the weight of the resultant mixture was weighed and aged while stirring for 5 minutes in a 60° C. thermostatic bath to sufficiently support the graphite catalyst metal precursor. While maintaining the above temperature, the aged mixture was vacuum-dried while rotating at 80 rpm, vacuum-dried, and dried, and the weight thereof was measured to determine the moisture removal amount (the weight after drying: about 14.1 wt %). The resultant dried reaction product was subjected to secondary calcination at 700° C. for 4 hours to prepare a supported catalyst.

Carbon nanotubes were synthesized in a laboratory-scale fixed-bed reactor using the supported catalyst for synthesis of carbon nanotubes prepared as above. The supported catalyst for synthesis of carbon nanotubes thus prepared was mounted on a central portion of a quartz tube having an inner diameter of 55 mm, heated to 670° C. in a nitrogen atmosphere, and then the temperature was maintained. Thereafter, the reaction was performed for 1 hour while a gas mixture of nitrogen, hydrogen, and ethylene at a mixing volume ratio of 1:1:1 was allowed to flow at a rate of 180 ml/min, and thereby bundle type carbon nanotubes were synthesized.

Example 1: Preparation of Conductive Material Dispersed Liquid 2 parts by weight of bundle type CNTs (average strand diameter=15 nm) and 0.4 part by weight of a partially hydrogenated acrylonitrile butadiene-based rubber (content of a repeating unit of a structure derived from an α,β-acrylonitrile: 54 wt %, content of a repeating unit of a structure derived from a hydrogenated butadiene: 9 wt %, weight average molecular weight: 260,000 g/mol, and polydispersity index (PDI)=2.9) were added to 97.6 parts by weight of a solvent of N-methylpyrrolidone (NMP), and mixed for 1 hour using a homogeneous mixer (VMA LC55, impeller/3000 rpm). The resultant mixture was milled for 90 minutes using a NETZSCH bead mill (NETZSCH Mini-cer, average diameter of beads: 1 mm, rotation speed: 3,000 rpm) to obtain a carbon nanotube dispersed liquid.

Example 2: Preparation of Conductive Material Dispersed Liquid

The carbon nanotube dispersed liquid was prepared in the same manner as in Example 1 except that bead milling was performed for 120 minutes.

Comparative Example 1: Preparation of Conductive Material Dispersed Liquid

The carbon nanotube dispersed liquid was prepared in the same manner as in Example 1 except that bead milling was not performed.

Comparative Example 2: Preparation of Conductive Material Dispersed Liquid

The conductive material dispersed liquid was prepared in the same manner as in Example 1 except that bead milling was performed for 30 minutes.

Comparative Example 3: Preparation of Conductive Material Dispersed Liquid

The carbon nanotube dispersed liquid was prepared in the same manner as in Example 1 except that bead milling was performed for 60 minutes.

Comparative Example 4: Preparation of Conductive Material Dispersed Liquid

The carbon nanotube dispersed liquid was prepared in the same manner as in Example 1 except that entangled type CNTs (FT9110, manufactured by Cnano Technology Ltd., average strand diameter=15 nm) were used instead of the bundle type CNTs.

Experimental Example 1

The particle size, purity, BET specific surface area, bulk density, true density, secondary structure shape, diameter and content of metal impurities of carbon nanotubes of the conductive materials used in Example 1 and Comparative Example 4 each were measured by the following methods, and the results are shown in the following Table 1.

1) Secondary structure and particle size: the particle size and the shape of the secondary structure of the CNTs were observed using a scanning electron microscope.
2) Diameter of unit: the diameter of unit was measured using an SEM and the BET method.
3) Crystallinity (ID/IG ratio): the average value was obtained from a ratio (ID/IG) of a maximum peak intensity (ID) of a D band at 1,340 to 1,360 cm$^{-1}$ to a maximum peak intensity (IG) of a G band at 1,575 to 1,600 cm$^{-1}$ obtained by Raman spectroscopy using a laser having a wavelength of 514 nm.
4) Volume resistance: carbon nanotube powder was filled in an insulating mold with a diameter of 1 mm and pressed to measure the current and voltage of the surface using four probes, and a volume resistance at a pressure of 62 MPa was calculated by applying a correction factor.
5) BET specific surface area: the BET specific surface area was calculated from the adsorption amount of nitrogen gas at a liquid nitrogen temperature (77K) using BELSORP-mini II manufactured by BEL JAPAN, INC.
6) Bulk density: the carbon nanotube was filled in a 25 ml container of known weight and weighed, and the bulk density was measured by conversion of the density.

TABLE 1

| | Example 1 | Comparative Example 4 |
|---|---|---|
| Shape of secondary structure | Bundle type | Entangled type |
| Average strand diameter (nm) | 15 | 15 |
| ID/IG ratio        Average | 0.95~1.04 | 1.0 |
| Volume resistance (Ω · cm, @62 MPa) | 0.00817 | 0.0273 |
| BET specific surface area (m$^2$/g) | 249 | 197 |
| Bulk density (kg/m$^3$) | 23 | 53 |

Experimental Example 2

The rheological properties such as complex modulus, viscosity and the like od each of the conductive material dispersed liquids prepared in Examples 1 and 2 and Comparative Examples 1 to 4 were measured.

In order to measure complex modulus and viscosity, after setting the distance between the circular rotary plates of the rheometer (model name: AR series, manufactured by TA Instruments, Inc.) as a viscosity measuring device to be constant, the conductive material dispersed liquid having a volume corresponding to the volume to be filled in the gap was put thereinto, a shear rate is set in the range of 10$^{-3}$ to 10$^3$ using 1/s as a unit at a frequency of 1 Hz to measure a force generated when the rotary plates are rotated, and thereby complex modulus was measured. Further, shear viscosity at a shear rate of 1/6.3 s was measured. The results are shown in the following Table 2 and FIGS. 1 and 2.

TABLE 2

| | Complex modulus (Pa) | Shear viscosity (@1/6.3 s, shear rate)(Pa · s) |
|---|---|---|
| Comparative Example 1 | 2191 | 4.8 |
| Comparative Example 2 | 1131 | 13.8 |
| Comparative Example 3 | 864 | 10.3 |
| Comparative Example 4 | 15 | 0.98 |
| Example 1 | 291 | 8.1 |
| Example 2 | 244 | 7.3 |

Figure 1:
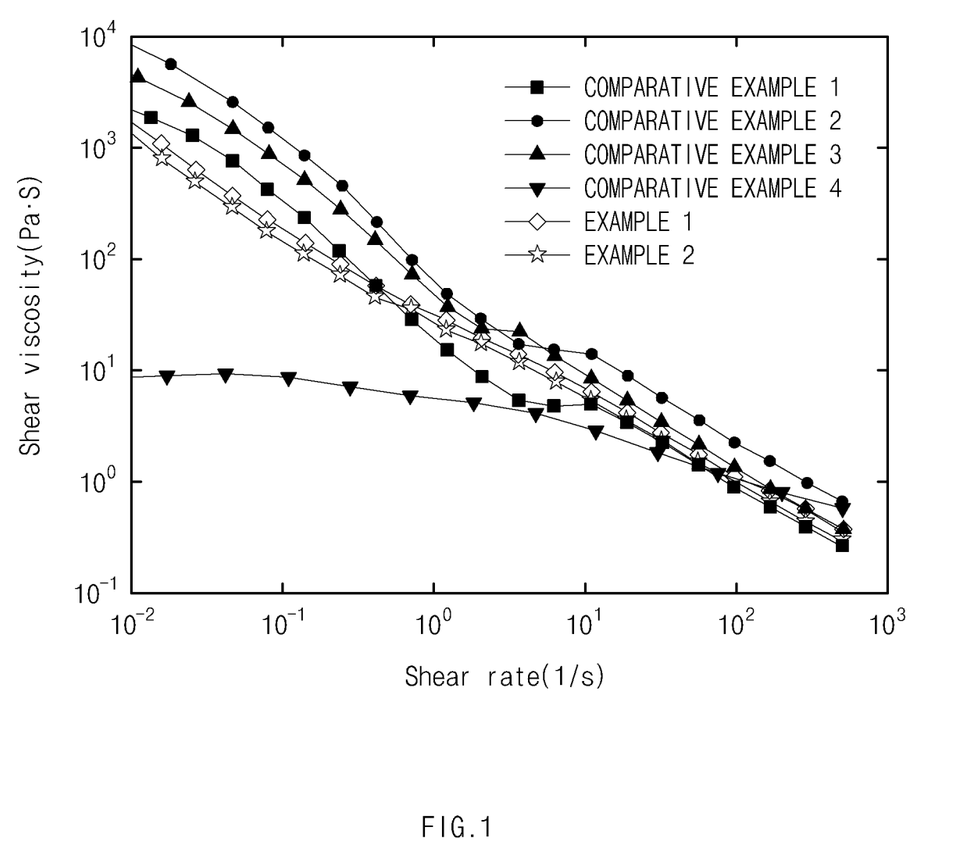
FIG. 1 is a graph of observing a change in shear viscosity according to the shear rate of conductive material dispersed liquids prepared in Examples 1 and 2 and Comparative Examples 1 to 4 in Experimental Example 1.

A shear thinning phenomenon was observed throughout the measurement.

In Comparative Examples 1 to 3, a graph of a shear viscosity according to an increase in shear rate showed a curved line, but in Examples 1 and 2, the graph showed a straight line shape and the inclination became smaller. The curve in the graph of Comparative Examples 1 to 3 was generated because local aggregation of particles occurred due to insufficient dispersion in the viscoelastic dispersion liquid.

Figure 2:
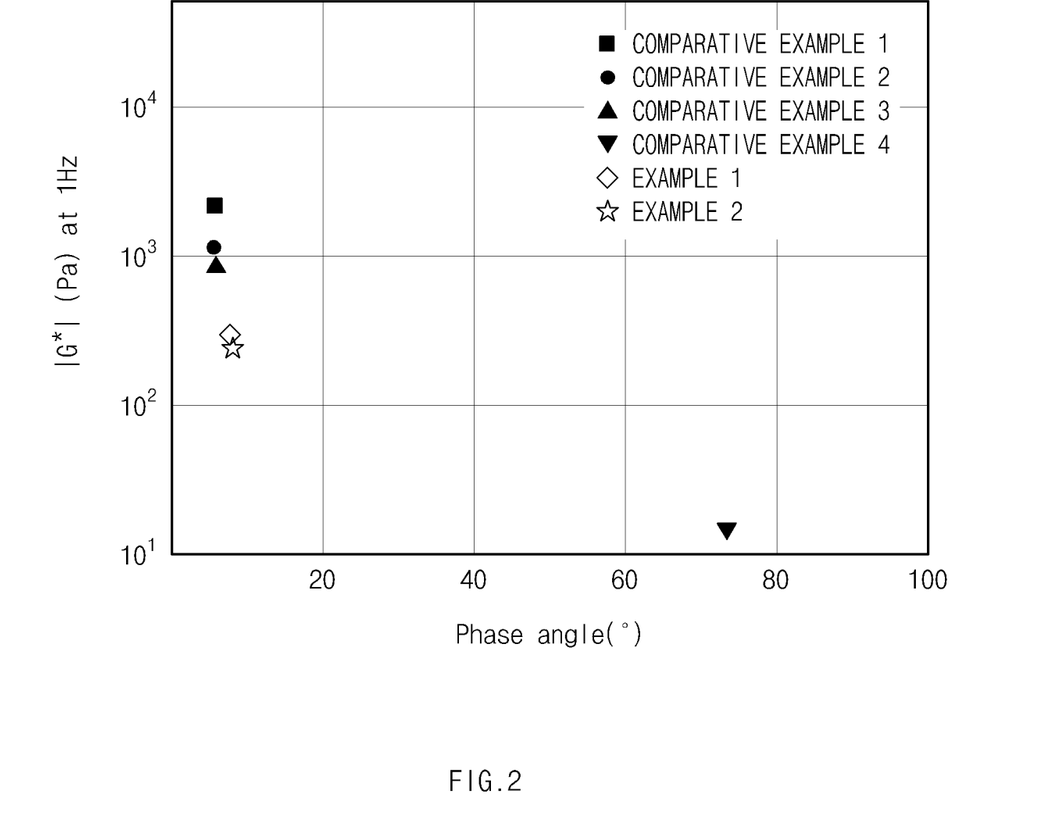
FIG. 2 is a graph of observing the phase angle and complex modulus of conductive material dispersed liquids prepared in Examples 1 and 2 and Comparative Examples 1 to 4 in Experimental Example 2.

Generally, in viscoelastic materials, elasticity varies depending on the degree of stress applied, and the smaller inclination represents that there is almost no change in elasticity even with increasing stress. That is, the better the dispersion condition is, the smaller the complex modulus value which is a measure of the modulus of elasticity is.

The complex modulus values decreased as the dispersion time increased, and the complex modulus values of dispersion liquids of Examples 1 and 2 were significantly reduced compared to Comparative Examples 1 to 3. Specifically, a complex modulus was 300 Pa or less when no curves were observed in the graph of shear viscosity according to an increase in shear rate.

Further, the conductive material dispersed liquids of Examples 1 and 2 had a lower shear viscosity as compared with Comparative Examples 2 and 3. Accordingly, it can be seen that carbon nanotubes are uniformly dispersed in the conductive material dispersed liquids of Examples 1 and 2.

Experimental Example 3

The particle size distribution and the solid content of the carbon nanotube dispersed liquids of Examples 1 and 2, and Comparative Examples 1 to 4 each were measured. The results are shown in the following Table 3.

Particle size distribution: samples were introduced into a commercially available laser diffraction particle size analyzer (e.g., Microtrac MT 3000) to irradiate an ultrasound of about 28 kHz at an output of 60 W, and then each average particle size ($D_{99}$) on the basis of 99% in the particle size distribution in the measuring device was calculated.

TABLE 3

| | Example 1 | Example 2 | Comparative Example 1 | Comparative Example 2 | Comparative Example 3 | Comparative Example 4 |
|---|---|---|---|---|---|---|
| Solid content in dispersion liquid (wt %) | 2.4 | 2.4 | 2.4 | 2.4 | 2.4 | 2.4 |
| $D_{99}$ (μm) | 31 | 19 | 157 | 106 | 78 | 55 |

The particle size distribution of the carbon nanotube-dispersant composite in the carbon nanotube dispersed liquids of Examples 1 and 2 was lower than that of Comparative Examples 1 to 3.

Preparation Example 2: Preparation of Positive Electrode and a Lithium Secondary Battery Each of a positive electrode for a lithium secondary battery and a lithium secondary battery was produced using the carbon nanotube dispersed liquids prepared in the Examples 1 and 2 and Comparative Examples 1 to 3.

Specifically, 9,700 parts by weight of $LiNi_{0.6}Mn_{0.2}Co_{0.2}O_2$ as a positive electrode active material and 200 parts by weight of a PVdF binder based on 100 parts by weight of the carbon nanotubes were added to the carbon nanotube dispersed liquid prepared in Example 1 and mixed to prepare a composition for forming a positive electrode (viscosity: 5000 mPa·s). The compositions for forming a positive electrode thus prepared were applied onto an aluminum current collector at a loading amount of 630 mg/25 cm², dried at 130° C., and roll-pressed to prepare positive electrodes.

Further, natural graphite as a negative electrode active material, a carbon black conductive material, and a PVdF binder was mixed in a weight ratio of 85:10:5 in a solvent of N-methylpyrrolidone to prepare a composition for forming a negative electrode, and the composition was applied onto a copper current collector to prepare a negative electrode.

An electrode assembly was prepared by interposing a porous polyethylene separator between the positive electrode and the negative electrode prepared as above. The electrode assembly was positioned in the case and an electrolyte was injected into the case to prepare a lithium secondary battery. Here, the electrolyte was prepared by dissolving 1.0 M lithium hexafluorophosphate ($LiPF_6$) in an organic solvent including ethylene carbonate/dimethyl carbonate/ethyl methyl carbonate (mixing volume ratio=3:4:3).

Experimental Example 4

The powder resistance of the composition for forming an electrode prepared using the conductive material dispersed liquids of Examples 1 to 2 and Comparative Examples 1 to 3 was measured. The result thereof and the result of the complex modulus of the conductive material dispersed liquid each are shown in the following Table 4 and FIG. 3.

The powder resistance was measured under the condition of 62 MPa using a powder resistance meter (HPRM-A2, manufactured by Hantech Co., Ltd.) after each of the prepared compositions for forming an electrode was dried and ground.

TABLE 4

| | Complex modulus (Pa) | Powder resistance @62 MPa (Ω · cm) |
|---|---|---|
| Comparative Example 1 | 2191 | 200.7 |
| Comparative Example 2 | 1131 | 104.8 |
| Comparative Example 3 | 864 | 90.6 |
| Example 1 | 291 | 26.2 |
| Example 2 | 244 | 21.9 |

Figure 3:
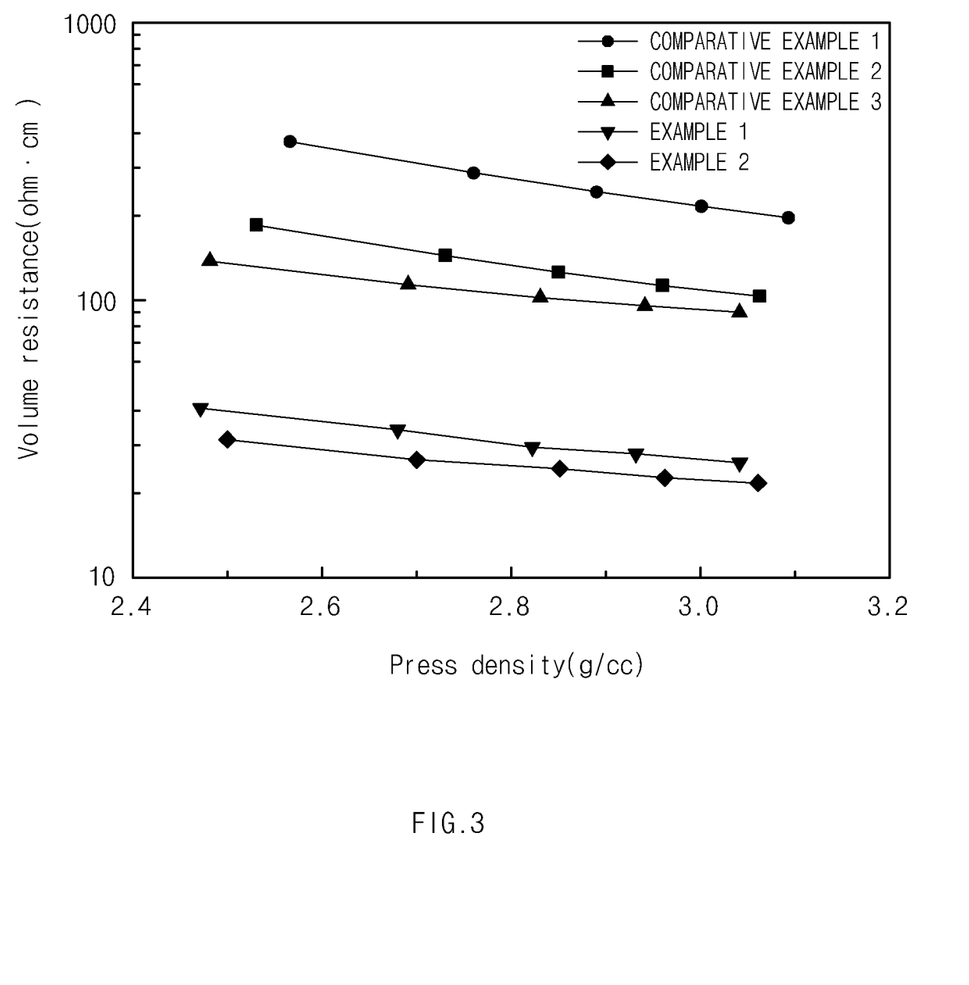
FIG. 3 is a graph of observing a change in powder resistance according to press density of each of compositions for forming an electrode prepared using the conductive material dispersed liquids prepared in Examples 1 and 2 and Comparative Examples 1 to 3 in Experimental Example 3.

As a result of measurement, the conductive material dispersed liquids used in Examples 1 and 2 had a volume resistance of 0.01 to 0.04 ohm-cm at a powder density of 0.5 to 1.6 g/cc, showing a lower value of volume resistance compared with that of Comparative Examples 1 to 3 at the same powder density range.

Further, it was confirmed that the powder resistance was reduced with a reduction width similar to the reduction width of the complex modulus of the conductive material dispersed liquid. Accordingly, it can be expected that the output characteristics of a battery of the conductive material dispersed liquids of Examples 1 and 2 are significantly improved as compared with Comparative Examples 1 to 3.

The invention claimed is:

1. A conductive material dispersed liquid, comprising:
a conductive material including bundle-type carbon nanotubes;
a dispersant including a hydrogenated nitrile-based rubber; and
a dispersion medium,
wherein a complex modulus (|G*| @ 1 Hz) of the conductive material dispersed liquid is in a range of 20 to 500 Pa when measured by a rheometer at a frequency of 1 Hz,
wherein the hydrogenated nitrile-based rubber includes a repeating unit of a structure derived from a hydrogenated conjugated diene at 1 to 15 wt % based on the total weight of the rubber.

2. The conductive material dispersed liquid according to claim 1, wherein a shear viscosity of the conductive material dispersed liquid is in a range of 2 to 20 Pa·s at a shear rate of 1/6.3 s when measured by a rheometer.

3. The conductive material dispersed liquid according to claim 1, wherein the carbon nanotubes have an average value in a range of 0.7 to 1.2 of a ratio (ID/IG) of a maximum peak intensity (ID) of a D band at 1,360±50 cm$^{-1}$ to a maximum peak intensity (IG) of a G band at 1,580±50 cm$^{-1}$ obtained by Raman spectroscopy using a laser having a wavelength of 514 nm.

4. The conductive material dispersed liquid according to claim 1, wherein the carbon nanotubes have a volume resistance of 0.01Ω· cm or less at a pressure of 62 MPa.

5. The conductive material dispersed liquid according to claim 1, wherein the carbon nanotubes are included at 1 to 5 wt % based on the total weight of the conductive material dispersed liquid.

6. The conductive material dispersed liquid according to claim 1, wherein the hydrogenated nitrile-based rubber includes a repeating unit of a structure derived from an α,β-unsaturated nitrile at 10 to 60 wt % based on the total weight of the rubber.

7. The conductive material dispersed liquid according to claim 1, wherein the hydrogenated nitrile-based rubber is a hydrogenated acrylonitrile butadiene-based rubber including a repeating unit of a structure derived from hydrogenated butadiene at 1 to 15 wt % and a repeating unit of a structure derived from acrylonitrile at 10 to 60 wt % based on the total weight of the rubber.

8. The conductive material dispersed liquid according to claim 1, wherein the hydrogenated nitrile-based rubber has a weight average molecular weight of 10,000 to 700,000 g/mol, and a polydispersity index of 2.0 to 6.0.

9. The conductive material dispersed liquid according to claim 1, wherein the dispersant is included at 10 to 50 parts by weight based on 100 parts by weight of the carbon nanotubes.

10. The conductive material dispersed liquid according to claim 1, wherein the dispersant is introduced into a surface of the carbon nanotubes to form a carbon nanotubes-dispersant composite, and the carbon nanotubes-dispersant composite has a $D_{99}$ of particle size distribution of 50 μm or less and is included in an amount of 1 to 5 wt % based on the total weight of the dispersed liquid.

11. The conductive material dispersed liquid according to claim 1, wherein the dispersion medium is an amide-based organic solvent.

12. A method of preparing a conductive material dispersed liquid, comprising mixing a conductive material which includes bundle-type carbon nanotubes, a dispersant and a dispersion medium comprising a hydrogenated nitrile-based rubber, and then milling such that a complex modulus (|G*| @ 1 Hz) of the conductive material dispersed liquid is in a range of 20 to 500 Pa when measured by a rheometer at a frequency of 1 Hz, and
wherein the hydrogenated nitrile-based rubber includes a repeating unit of a structure derived from a hydrogenated conjugated diene at 1 to 15 wt % based on the total weight of the rubber.

13. The method according to claim 12, wherein the milling is performed by a bead mill.

14. The method according to claim 12, wherein the milling is performed using a bead mill having an average diameter of 0.5 to 2 mm for 90 to 120 minutes.

15. A composition for forming an electrode of a secondary battery, comprising:
an electrode active material;
a binder; and
the conductive material dispersed liquid according to claim 1.

* * * * *